United States Patent [19]

Middleton

[11] 3,855,762
[45] Dec. 24, 1974

[54] TOBACCO HARVESTER WITH IMPROVED SPEARING SYSTEM

[76] Inventor: Carlisle A. Middleton, 28 Dungarrie Rd., Baltimore, Md. 21228

[22] Filed: Feb. 25, 1974

[21] Appl. No.: 445,156

Related U.S. Application Data

[63] Continuation-in-part of Ser. No. 365,564, May 31, 1973, Pat. No. 3,798,884.

[52] U.S. Cl. ................................................ 56/27.5
[51] Int. Cl. ........................................... A01d 45/16
[58] Field of Search ........................ 56/27.5; 214/5.5

[56] References Cited
UNITED STATES PATENTS
2,477,068 7/1949 La Motte .............................. 56/27.5
2,836,950 6/1958 Anderson .............................. 56/27.5

Primary Examiner—Louis G. Mancene
Assistant Examiner—J. N. Eskovitz
Attorney, Agent, or Firm—John F. McClelland, Sr.

[57] ABSTRACT

A vehicular machine for field harvesting air-cure type tobacco which severs plants and hangs the severed plants by the stalks on tobacco sticks, having an improved plant-stalk spearing system in which a spear is rigidly held in disposition for impaling plant stalks and for having impaled plant stalks passed along the length thereof and onto a tobacco stick coaligned therewith, by a plurality of arcuate jaws operated in arcuate paths laterally of the spear; the spear has a particular cross-sectional shape and lateral lugs oriented to co-act with the shape of the jaws; conveyor-mounted jaw shields protect leaves.

17 Claims, 8 Drawing Figures

TOBACCO HARVESTER WITH IMPROVED SPEARING SYSTEM

This application is a continuation-in-part of my copending application Ser. No. 365,564 filed May 31, 1973, for TOBACCO HARVESTER, and now U.S. Pat. No. 3,798,884, issued Mar. 26, 1974.

This invention relates generally to tobacco harvesting and specifically to a harvester for air-cure type tobacco-like that described in my copending application.

My copending application discloses a tobacco harvester having a stalk cutter, an offset-roller belt conveyor for gently holding plants conveyed and a cut plant retainer and synchronizer at the output of the belt conveyor, a conveyor-spacer for urging the stalks in spaced succession, a spear for impaling the stalks urged, a pivotal alternating-gripping system for the spear allowing passage of the stalks urged, a stick holder aligned with the spear, a stick ejection and delivery system, and a synchronizing power system for driving the operating parts in unison.

During the second crop season of field tests with the above harvester all systems functioned perfectly with the exception that some local injury of the lowest leaves on the stalks was occasionally apparent. Since an objective of the invention is to eliminate every trace of such injury, no matter how small, an an investigation was made. The injury was found to occur in the leaves on the stalk at the extreme butt end, on the opposite sides of the plant. Leaves were found to flip over or under the spear periodically in position for pinching a part of the leaf between a spear gripper jaw and the spear.

As result, parts of the spear system and co-acting conveyor system were redesigned and retested and found to eliminate the problem. Details not described hereon as changed remain substantially identical to those described in my copending application.

The re-design preserves the reliability and durability of the harvester systems affected while adding little to the cost or complexity, and improves operator visibility during harvesting. Access for adjustment is preserved and tolerance of adjustment is expanded, maintaining positive spear grip under conditions which would occur as result of unskilled or careless adjustment.

In brief cursive summary, given for purposes of description only, the new portions of the tobacco harvester function and cooperate for the same purposes and in the same general location as before, but the spear grippers advance and retreat from the spear sides, exhibiting minimal area of moving parts which could disturb leaves of tobacco conveyed past and shielding the parts moved through provision of special movement under close fitting hoods or leaf shields carried by the thrust arms urging tobacco plants past the spear grippers.

Figure 1:
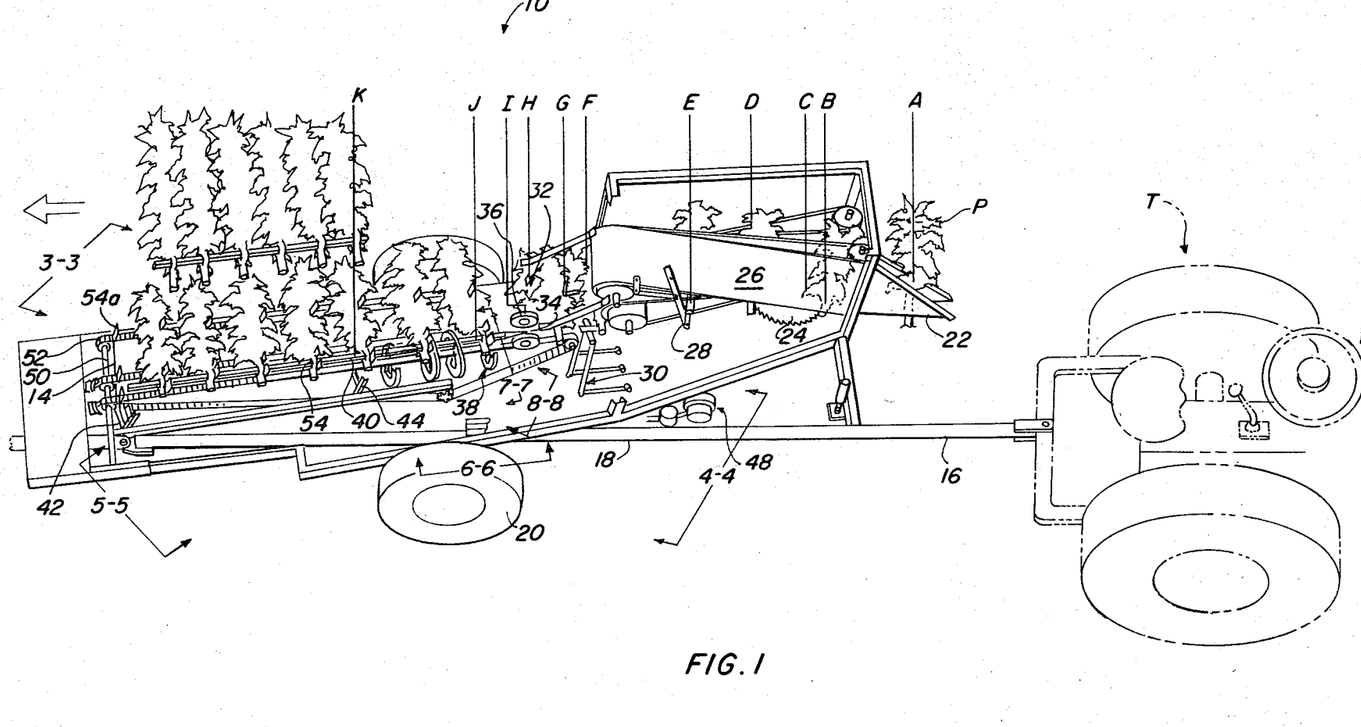
FIG. 1 is a right side isometric diagrammatical view of portions of harvester systems.
Figure 2:
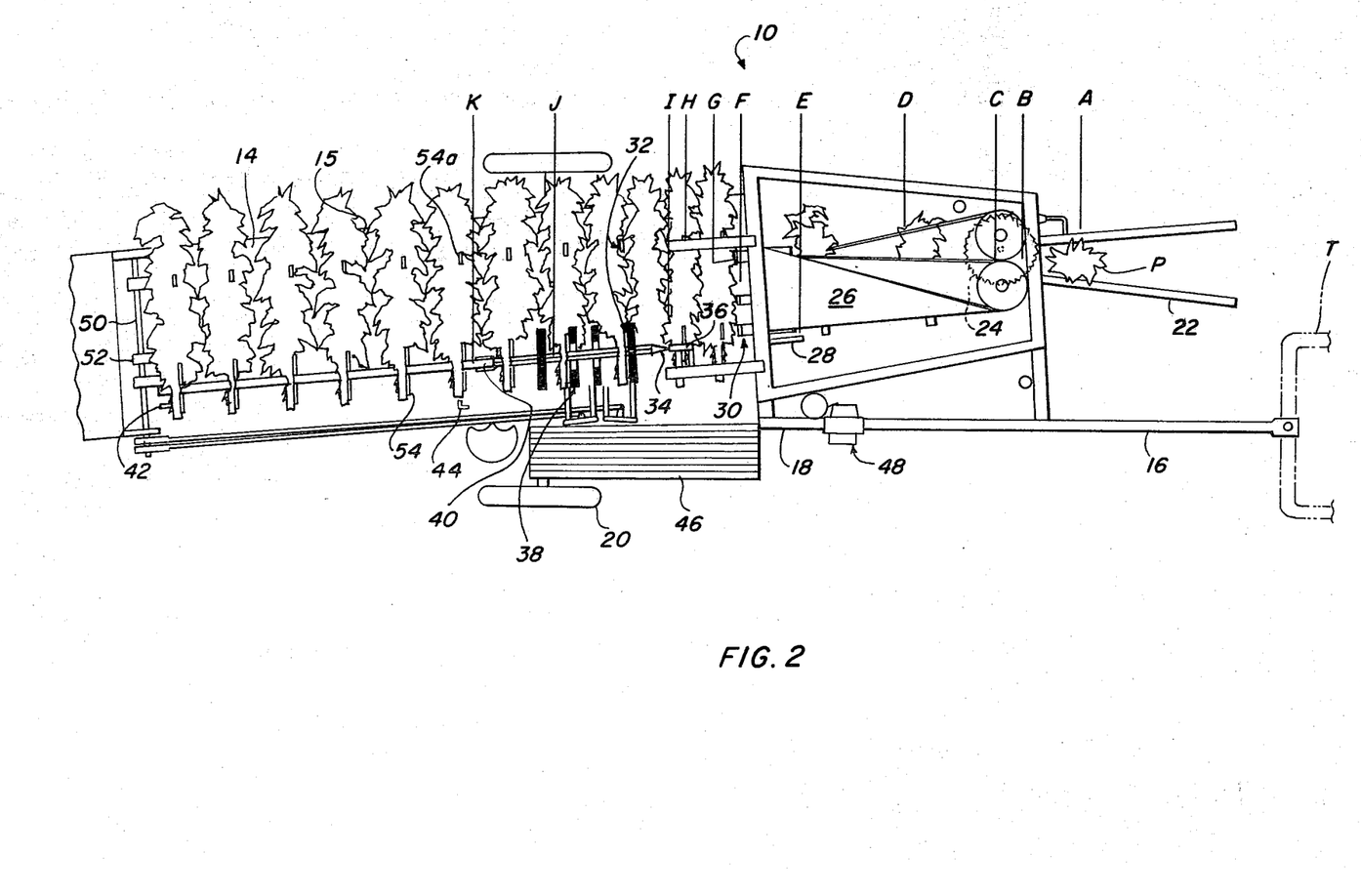
FIG. 2 is a plan view of portions of harvester systems.
Figure 3:
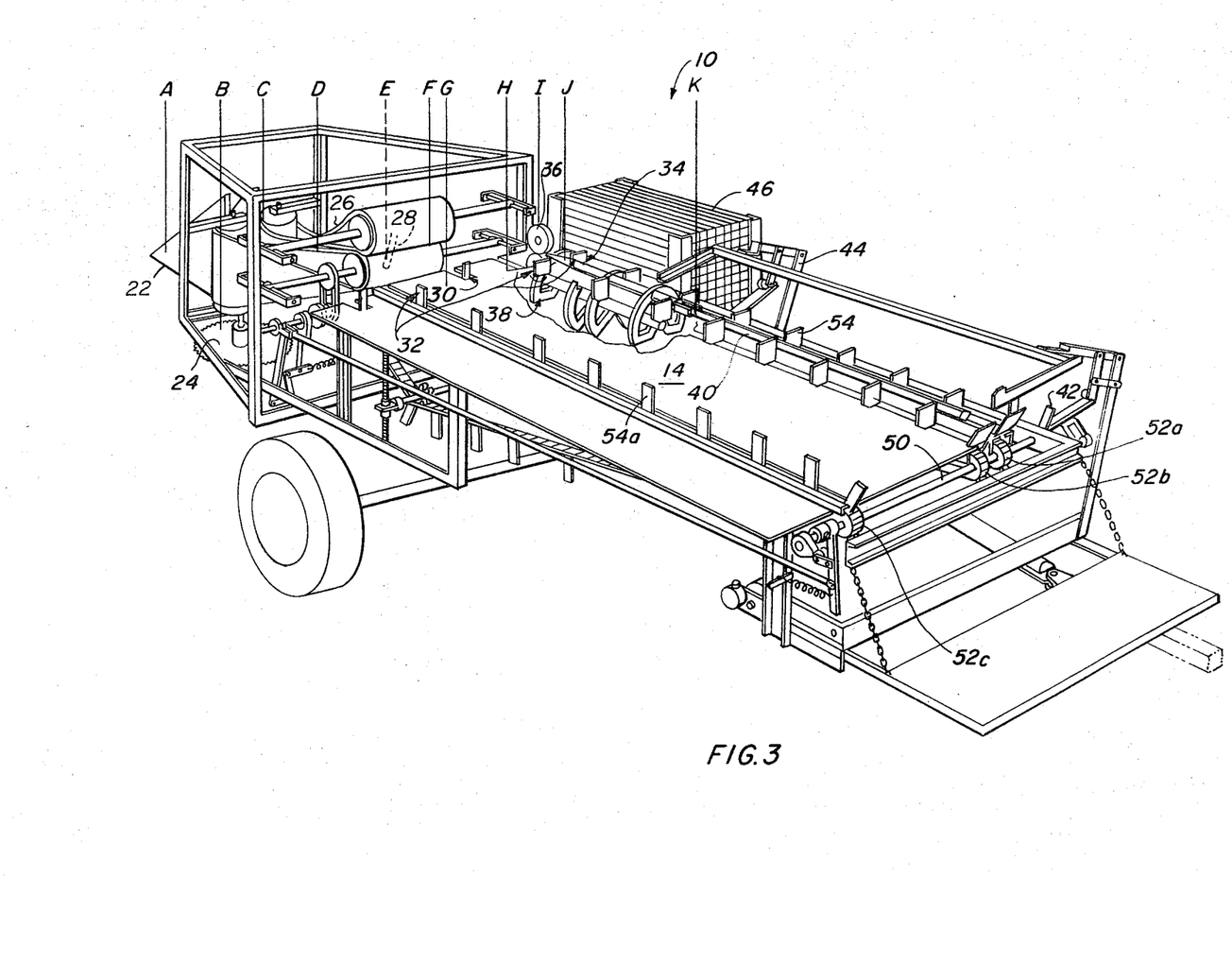
FIG. 3 is a left rear quarter isometric view of portions of harvester systems adapted from 3—3, FIG. 1.

The above and other objects and advantages of the invention will become more apparent from the following description, including the drawings in which, like numerals designating like parts:

GENERAL DESCRIPTION OF THE HARVESTER, FIGS. 1-3

FIGS. 1-3 show the general relations of the systems of the tobacco harvester 10 of this invention, generally centered around a table or platform 14 with appurtenant accessories, the vehicle being preferably drawn by a tractor T by means of a tongue 16 attached to frame 18 on which the platform is supported and which is mounted on a pair of wheels 20.

At Station A guides 22 funnel stalks of standing plants p into a circular saw 24 at Station B which severs the stalks near the ground. At Station C paired belts 26 grasp and convey the severed plants upwardly and rearwardly, the plants being laid over generally as they rise, Station D, each triggering a synchronizing system 28 at Station E before discharge by dropping downward at Station F. The synchronizing system triggers one increment of rearward motion of the horizontal conveyor system to be described next.

At Station G where they fall, a shuttle system 30 pushes the plants rearwardly into the grasp of a horizontal conveyor system 32, Station H, having three chains equipped with parallel sets of pushers which intermittently move the plants rearwardly, in equal increments, impaling the butts in sequence on the point of a spear 34 fixed in horizontal position pointing forward between vertical plant-centering rollers 36 at Station I.

At Station J the impaled plants are forced by the horizontal conveyor system rearwardly along the spear between two double sets of semi-caliper type laterally operating jaws of a spear gripping system 38 which maintains the spear in the horizontal fore-and-aft position at all times, while dodging the passing plants by alternately opening and closing, so that at least one double set of jaws grasps the spear at any moment. Intermittent motion of the conveyor system is synchronized with the opening and closing of the jaws to facilitate this action.

At Station K the impaled plants pass onto a tobacco stick 40 co-aligned with the spear, and when the stick is filled trigger a sensor 42, ejecting the stick upwardly for manual removal and replacing the filled tobacco stick with an empty stick manually fed into the feeder system 44 from a supply of sticks 46 (FIGS. 2 and 3) in co-alignment with the spear, ready for another sequence of plants.

A gasoline engine (FIGS. 1 and 2) and hydraulic pump drive system 48 (fragmentarily indicated in the Figures) operate the systems preferably. A power output shaft 50 drives the horizontal conveyor system 32 of endless belt assemblies 52a, 52b, 52c having parallel thrust arms 54 on belts closely paralleling the spear and smaller arms 54a on a third belt (FIG. 3).

Shaft 50 also drives the spear gripper system 38.

THE SPEAR AND SPEAR GRIPPER SYSTEMS

Figure 4:
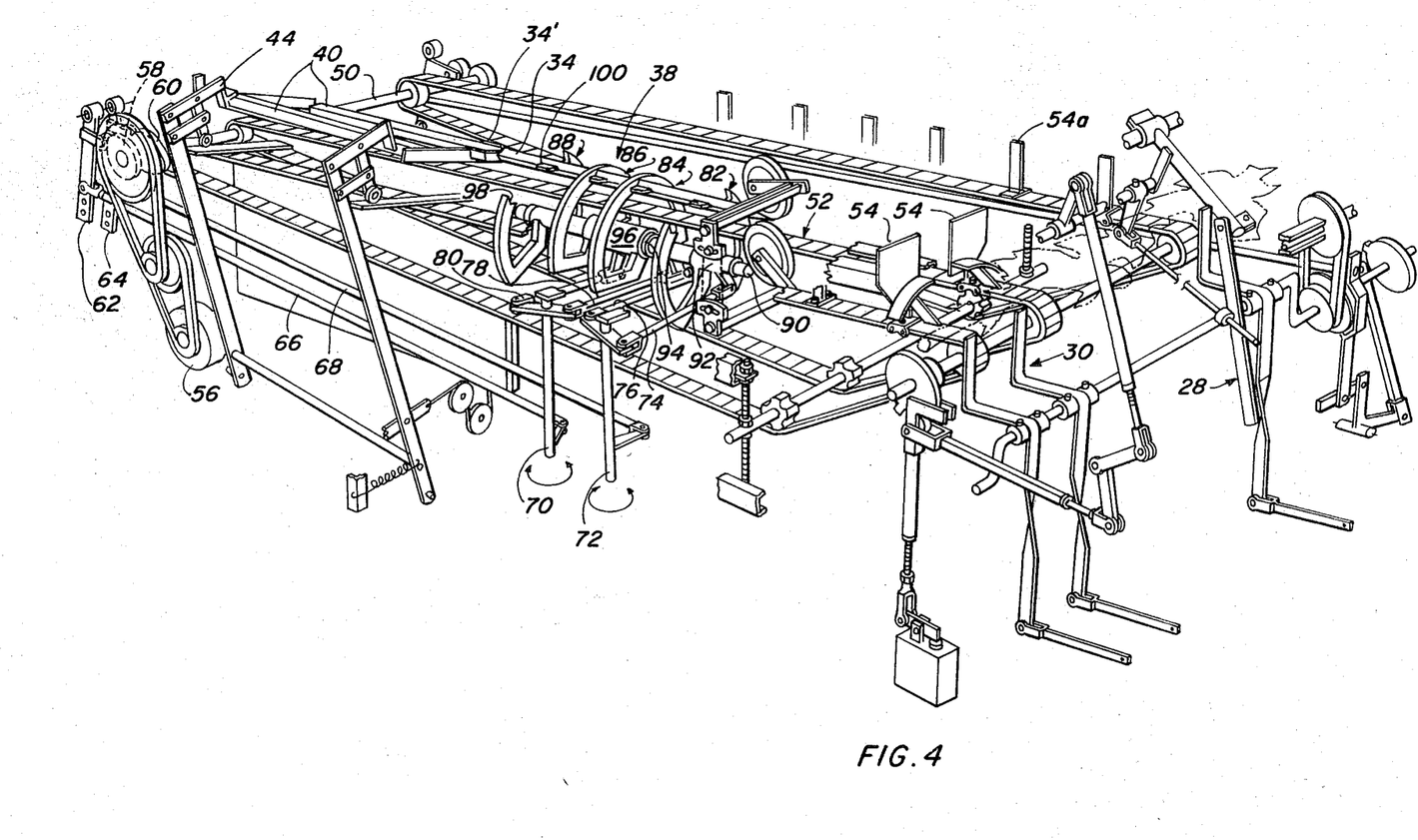
FIG. 4 is a right front quarter isometric detail adapted from 4—4, FIG. 1.
Figures 5, 6:
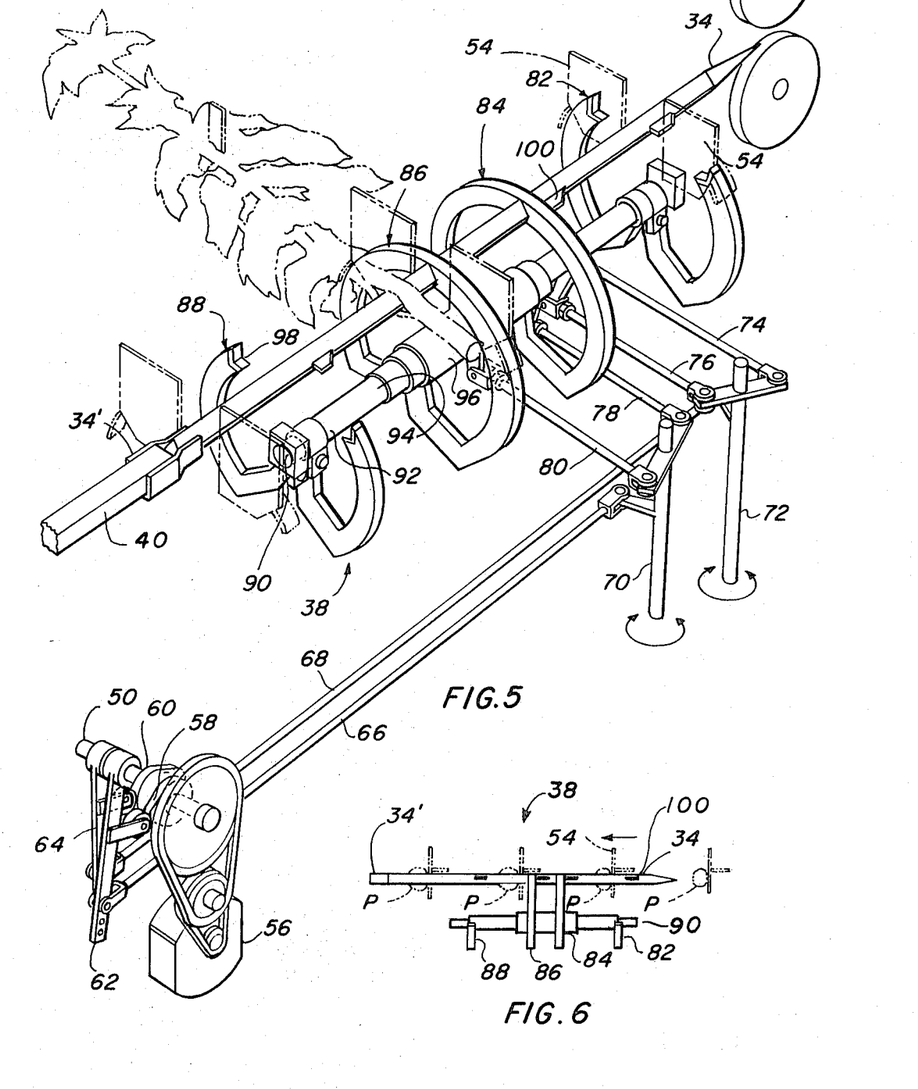
FIG. 5 is a right rear quarter fragmentary isometric view of a harvester system adapted from 5—5, FIG. 1.
FIG. 6 is a side-elevation diagrammatic detail adapted from 6—6, FIG. 1.

FIGS. 4, 5 and 6 variously show details of the spear gripper system 38. The drive of the spear gripper system (FIGS. 4 and 5) is by motor 56 through output shaft 50 by means of shaft cams 58, 60, followers 62, 64, follower rods 66, 68, bellcranks 70, 72, and jaw actuator rods 74, 76, 78, 80. The drive components are mounted to the frame in conventional manner, detailed in my copending application.

The spear gripper system comprises four double jaws or sets of jaws from front to rear; 82, 84, 86, 88, mounted respectively on four coaxial axles 90, 92, 94, 96, pivotally connected with respective jaw actuator rods.

The four sets of jaws operate as two pairs or double sets.

The first and fourth or frontmost and rearmost sets of jaws 82, 88, open and shut together as indicated, and the central or second and third sets of jaws 84, 86, likewise open and shut together, one of the double sets of jaws therefore being closed while the other is open.

Each jaw is a quarter-circle arc of bar centered on the axis of the axle system.

Jaws 84, 86, the center sets, are shown closed, rigidly holding spear 34. Jaws 82, 88, the outer set are shown open, in position to permit thrust arms of the succession of thrust arms 54 to push a spear-impaled plant along the spear between open jaws of set 82, in an increment of rearward travel.

It is important to note that the spacing between the two central sets of jaws 84 and 86 is made to be less than the spacing between either central set and the outer set proximate to it. This provides for compact spacing of plants while insuring rigidity of grip on the spear.

In operation (see FIG. 6 particularly) a plant passes through the jaws of the front set 82 which then close (in synchronism with the rear set 88) and in the next increment of rearward travel passes through the jaws of both central sets 84 and 86, and in the third successive increment of rearward travel passes through the jaws of the rearmost set 88.

Positions of rest of the incremental movement are rearwardly of the first, third and fourth sets of jaws only, not the second set.

Serial spacing of the actuator arms 54 is made such that a plant is introduced through the front jaws at the same time a plant is ejected through the rear jaws. Plants ejected successively pass over the rear socket 34' integral with the spear and onto a waiting tobacco stick, the forward end of which is held in the socket.

The spear preferably has as a shank a square-section steel bar oriented so that the faces of the square section are at 45° angles with the vertical and horizontal. The ends of the jaws have 90° "V" notches 98 oriented to grasp the spear in self-centering relation to the spear shank faces. Rubber "V" cushions 99 are an optional feature preferably cemented to the jaws to cushion the operation while maintaining the self-centering advantage.

A plate-like lateral protrusion or lug 100 extends horizontally from the spear shank slightly ahead of each grip position on the plant butt side. The forward edge of the lug is preferably slanted rearwardly, and the rearward edge is substantially perpendicular to the spear shank where it lies against a surface of the jaws which also is substantially perpendicular to the spear shank. This arrangement provides generous overlap positively preventing spear slippage to the rear even when the spear is gripped relatively loosely, as through careless initial adjustment of the spear grip assembly, and thus enlarges the adjustment tolerance in operation of the two sets of grips. The plant stalks split longitudinally when impaled on the spear and the lugs pass harmlessly through the splits.

Figures 7, 8:
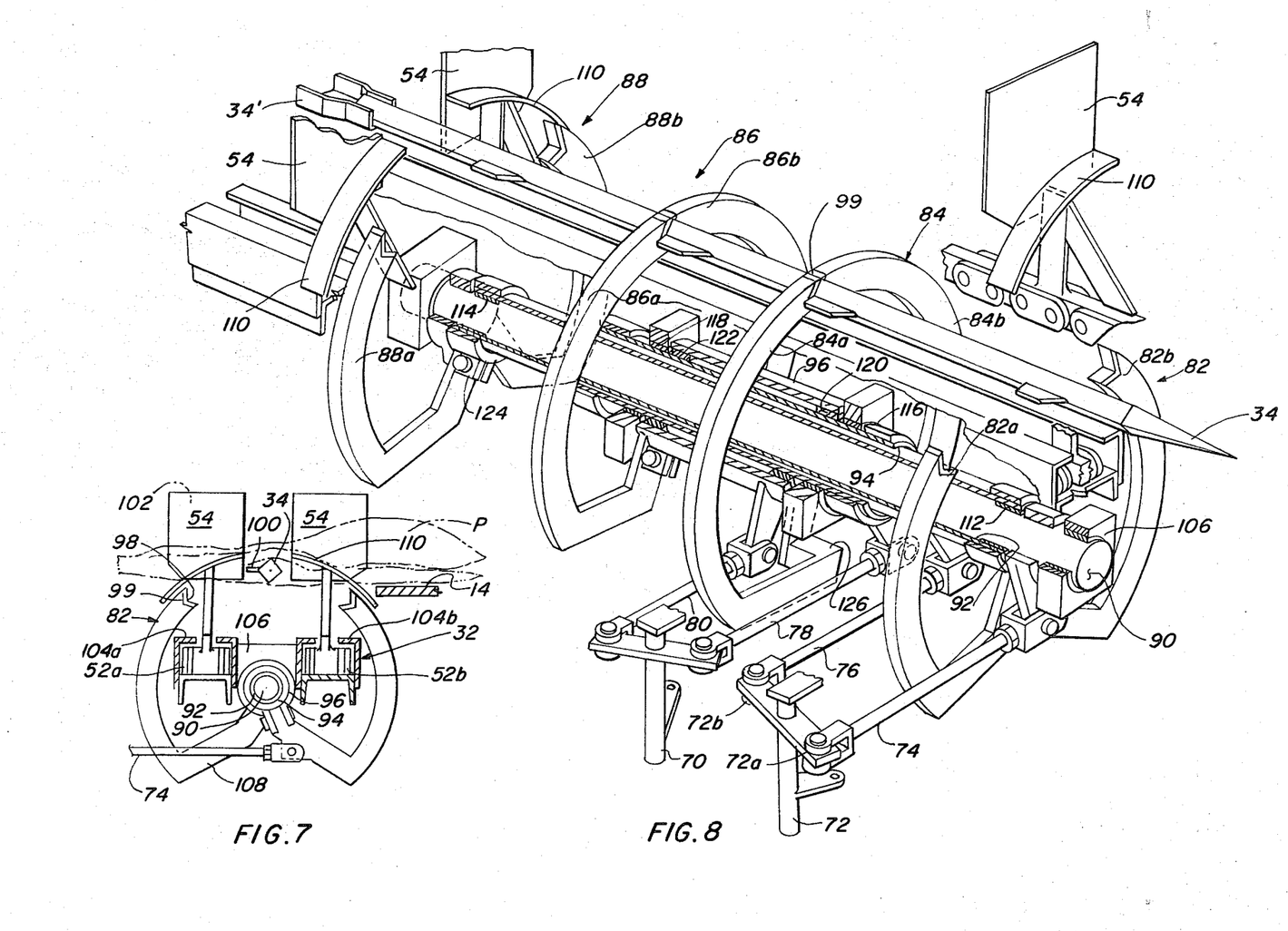
FIG. 7 is a front elevation detail in partial section adapted from 7—7, FIG. 1.
FIG. 8 is a partially exploded isometric view adapted from 8—8, FIG. 1.

FIG. 7 illustrates the relation and structure of the spear 34, the table 14, the thrust arms 54, of the proximate conveyor assemblies 32, the co-axial axles, the grippers, and the jaw actuator rods 74 (shown), 76, 78, 80. Plants p lie on the table 14 with the upper leaves and stalks, the bulk of the plants generally, above the level of all but the grip-ends of the jaws. Lower leaves such as that shown, are protected by the invention in the manner disclosed herein.

The conveyor thrust arms have broad thrust faces 102 and two successions of thrust arms pass along the length of the spear and stick aligned with the spear, one succession on each side urged along by respective conveyor belts 52a, 52b, running in respective leaf protecting channels 104a, 104b parallel-spaced to either side of the spear gripper system co-axial axles 90, 92, 94, 96, which may be supported by bearing supports 106 fastened to the channels.

The arcuate, quarter-circle grippers 82 are supported by and driven from the respective axles through substantially radial arms 108 connecting the lower ends of the arcuate jaws of the grippers. The chain channels lie safely and compactly within the arcs of travel of the gripper jaws. The gripper jaws travel in true arcs, and are shielded from leaf entanglement overhead by a conforming overhanging arcuate roof 110 attached to the rear face of each actuator arm. This arrangement minimizes possibility of jaw-motion injury to leaves, contact between the periphery of an arcuately moving arc-shaped jaw and tobacco plants being least likely to injure the plants of all types of passing motion, particularly when the face-area of the jaw is made small and is shielded as in the present case.

FIG. 8 illustrates the axle arrangement and the longitudinal relations of the parts indicated in the previous Figure. An axle assembly parallel-spaced below the centerline of the spear mounts the spear gripping jaws in position to grip the spear.

The axle assembly includes, first, a solid axle 90 supported at the ends by bearings 106, and mounting the far or left hand jaws 82b, 88b of the first and last sets 82, 88 of jaws, and driven by jaw actuator rod 74 from rotatable arm 72a of bellcrank 72.

Next, surrounding the solid axle 92 and extending between bearings 112 and 114 mounting it to the solid axle is hollow second axle 92, which mounts the near side or right hand jaws 82a, 88a, of the first and last sets of jaws 82, 88. Jaw actuator rod 76 operates these through connection with the opposite rotatable arm 72b of bellcrank 72, so that oscillating the bellcrank one way opens both jaw sets and the other way closes them.

A similar arrangement operates the other or inner sets of jaws 84, 86. A hollow third axle 94 is rotatably supported by external bearings 116, 118 to the frame of the harvester (not shown) in coaxial relation with the first and second axles, but without touching either, to prevent binding or undue run-out through accumulation of tolerances, and to afford economical construction.

For jaws 84b, 86b of the central sets of jaws 84, 86 are mounted to the third axle 94 and driven from jaw actuator rod 78. This drive is in all cases by direct connection with a jaw or by connection with a radial arm affixed to the axle, providing optional, convenient method of attachment according to convenience.

Hollow fourth axle 96, journalled to the third axle by bearings 120, 122 in similar manner mounts the near jaws 84a, 86a of the central set, which are driven from jaw actuator rod 80 through connection with the opposite side of bellcrank 70.

The two forward sets of jaws are preferably welded directly to the respective axles to assure positive drive at all times, since plant impalement exerts the greatest forces on the forward portions of the spear. The two rearward sets of jaws are preferably held to the respective axles as by rotationally adjustable clamps 124 to provide easy, precise adjustment of the setting of the axle-linked couples of jaws.

To keep the jaws at minimum thickness so that they can ride under the arcuate roofs 110 on the rear faces of the jaw actuators 54 with considerable shielding overhang of the roofs and can meet squarely, one jaw in each set is preferably offset at the connection between the radius arm and axle as at 126. This preserves the true circumferential arc of operation of the circular portions of the jaws.

Obviously many modifications and variations of the present invention are possible in light of the above teachings. It is, therefore, to be understood that within the scope of the appended claims the invention may be practiced otherwise than as specifically described.

What is claimed and desired to be secured by United States letters patent is:

1. In a tobacco harvester having a horizontally disposed spear with a pointed front, means for incrementally conveying tobacco plants for impalement of the stalks thereof on the spear, and means for gripping the spear alternately at different positions in synchronism with said incremental conveying to permit moving of impaled tobacco plant stalks therealong, the improvement comprising: the means for gripping the spear comprising: a plurality of sets of opposed arcuate jaws spaced along the length of the spear, means for mounting all said jaws about an axis parallel-spaced below the spear at a location positioning the jaws to open and close laterally of the spear.

2. In a tobacco harvester as recited in claim 1, the means for incrementally urging tobacco plants comprising: a spaced succession of actuator arms, means for moving the actuator arms in increments rearwardly past the spear proximate said jaws, and means on each actuator arm for shielding a said jaw.

3. In a tobacco harvester as recited in claim 2, wherein the arcs of said jaws of each set of jaws lie substantially in a circle centered on said axis, and where said jaw shielding means are arcuate.

4. In a tobacco harvester as recited in claim 2, wherein the means for mounting said jaws include a substantially radial arm affixed to the lower portion of each jaw.

5. In a tobacco harvester as recited in claim 3, wherein the means for moving the actuator arms lies within the arcs of said jaws.

6. In a tobacco harvester as recited in claim 1, wherein the spear has a lateral protrusion thereon proximately forward of a jaw of each set of jaws, wherein each protrusion has a rearward edge substantially perpendicular to the spear, and wherein the forward edge of each jaw proximate a protrusion has a forward surface substantially perpendicular to the spear.

7. In a tobacco harvester as recited in claim 6, wherein the spear has a square sectional-shape, wherein the spear is oriented with faces of the square sectional-shape at an angle to the horizontal, and wherein each jaw has a notch complementary to and positioned for engaging the spear square sectional-shape, for thereby self-centering the engagement of the jaws with the spear.

8. In a tobacco harvester as recited in claim 7, wherein each protrusion has a rearwardly sloping forward edge.

9. In a tobacco harvester as recited in claim 7, wherein said notch is "V" shaped for self centering on the spear, and wherein a "V" shaped pad is provided thereon for cushioning the operation of the jaws while preserving the self-centering thereof relative to the spear.

10. In a tobacco harvester as recited in claim 1, wherein the plurality of sets of jaws comprises: a first set of jaws in forward position with second, third and fourth sets of jaws in respective succession therebehind, and wherein the spacing between the second and third sets of jaws is less than the spacing between any other sets of jaws.

11. In a tobacco harvester as recited in claim 10, wherein said alternate gripping of the spear comprises opening and closing of the first and fourth sets of jaws in unison in alternation with opening and closing of the second and third sets of jaws in unison.

12. In a tobacco harvester as recited in claim 11, wherein said incremental movement defines periodic positions of rest for the actuator-arms proximately rearwardly of plural of said sets of jaws, said sets of jaws being the first, third and fourth sets of jaws only.

13. In a tobacco harvester as recited in claim 12, wherein the means for mounting the jaws comprise a plurality of coaxial axles, including: a first axle, means for securing the first axle to jaws of the first and fourth sets of jaws disposed on a side of the spear, a second axle coaxial with the first axle, means for securing to the second axle all jaws of the first and fourth sets of jaws other than the first said jaws thereof, a third axle, means for securing to the third axle jaws of the second and third sets of jaws disposed on a side of the spear, a fourth axle, means for securing to the fourth axle all jaws of the second and third sets of jaws other than the first said jaws thereof, and means for rotatably mounting all said axles.

14. In a tobacco harvester as recited in claim 13, wherein the means for rotatively mounting all said axles include at least: a bearing member connecting the first axle with a fixed portion of the harvester, a bearing member connecting the first and second axles, a bearing member connecting said third and fourth axles, and a bearing member connecting one of said third and fourth axles with a fixed portion of the harvester.

15. In a tobacco harvester as recited in claim 14, the means for gripping the spear including means for operating the sets of jaws, comprising at least: a oscillatable member having opposite rotatable parts, means for connecting one of said opposite rotatable parts for rotation of one of said axles, and means for connecting another one of said opposite rotatable parts for rotation of another of said axles.

16. In a tobacco harvester as recited in claim 14, wherein all said means for connecting said oppositely rotatable parts for rotation of said axles connect with forward portions of the respective axles.

17. In a tobacco harvester as recited in claim 13, wherein the means for mounting the jaws include a rotationally adjustable clamp at the respective connections to the axles of all jaws of the third and fourth sets of jaws.

* * * * *